(12) United States Patent
Buddhavaram et al.

(10) Patent No.: US 11,005,842 B2
(45) Date of Patent: May 11, 2021

(54) EXTERNAL STORAGE DEVICE THAT EXPANDS A DATA STORAGE CAPABILITY OF A HOST DEVICE

(71) Applicant: Seagate Technology LLC, Cupertino, CA (US)

(72) Inventors: Chandra Shaker Buddhavaram, Fremont, CA (US); Jean-Pierre Ruster, San Jose, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 270 days.

(21) Appl. No.: 15/852,944

(22) Filed: Dec. 22, 2017

(65) Prior Publication Data
US 2018/0183792 A1  Jun. 28, 2018

Related U.S. Application Data

(60) Provisional application No. 62/439,269, filed on Dec. 27, 2016.

(51) Int. Cl.
*H04L 29/06* (2006.01)
*H04L 29/08* (2006.01)
*H04L 12/40* (2006.01)

(52) U.S. Cl.
CPC ...... *H04L 63/0876* (2013.01); *H04L 63/0428* (2013.01); *H04L 67/02* (2013.01); *H04L 12/40032* (2013.01)

(58) Field of Classification Search
CPC . H04L 63/0876; H04L 63/0428; H04L 67/02; H04L 12/40032
See application file for complete search history.

(56) References Cited

U.S. PATENT DOCUMENTS

| | | | |
|---|---|---|---|
| 9,667,072 B2 | 5/2017 | Wen | |
| 9,678,537 B2 | 6/2017 | Kupferstein | |
| 9,678,760 B2 | 6/2017 | Lee et al. | |
| 2014/0075544 A1* | 3/2014 | Kim | G06F 21/10 726/16 |
| 2015/0135267 A1* | 5/2015 | Samorukov | G06F 11/1004 726/2 |
| 2016/0078245 A1* | 3/2016 | Amarendran | H04L 67/10 713/193 |

\* cited by examiner

*Primary Examiner* — Shin-Hon (Eric) Chen
*Assistant Examiner* — Jessica J South
(74) *Attorney, Agent, or Firm* — Westman, Champlin & Koehler, P.A.

(57) ABSTRACT

A method includes receiving a request from a host device to authenticate a device. The method further includes transmitting authenticating data to the host device. Responsive to successful authentication of the device, configuration interface and communication interface of the device is exposed to the host device. The method further includes processing commands from the host device after the device is successfully authenticated. Responsive to the processed commands, payload data is sent or received to or from the host device according to the communication interface.

17 Claims, 6 Drawing Sheets

EXTERNAL STORAGE DEVICE THAT EXPANDS A DATA STORAGE CAPABILITY OF A HOST DEVICE

RELATED APPLICATIONS

The instant applications claims the benefit and priority to the provisional patent application No. 62/439,269 filed on Dec. 27, 2016, which is incorporated herein by reference in its entirety.

SUMMARY

Provided herein is a method that includes receiving a request from a host device to authenticate a device. The method further includes transmitting authenticating data to the host device. Responsive to successful authentication of the device, configuration interface and communication interface of the device is exposed to the host device. The method further includes processing commands from the host device after the device is successfully authenticated. Responsive to the processed commands, payload data is sent or received to or from the host device according to the communication interface.

These and other features and advantages will be apparent from a reading of the following detailed description.

DESCRIPTION

Figure 1A:
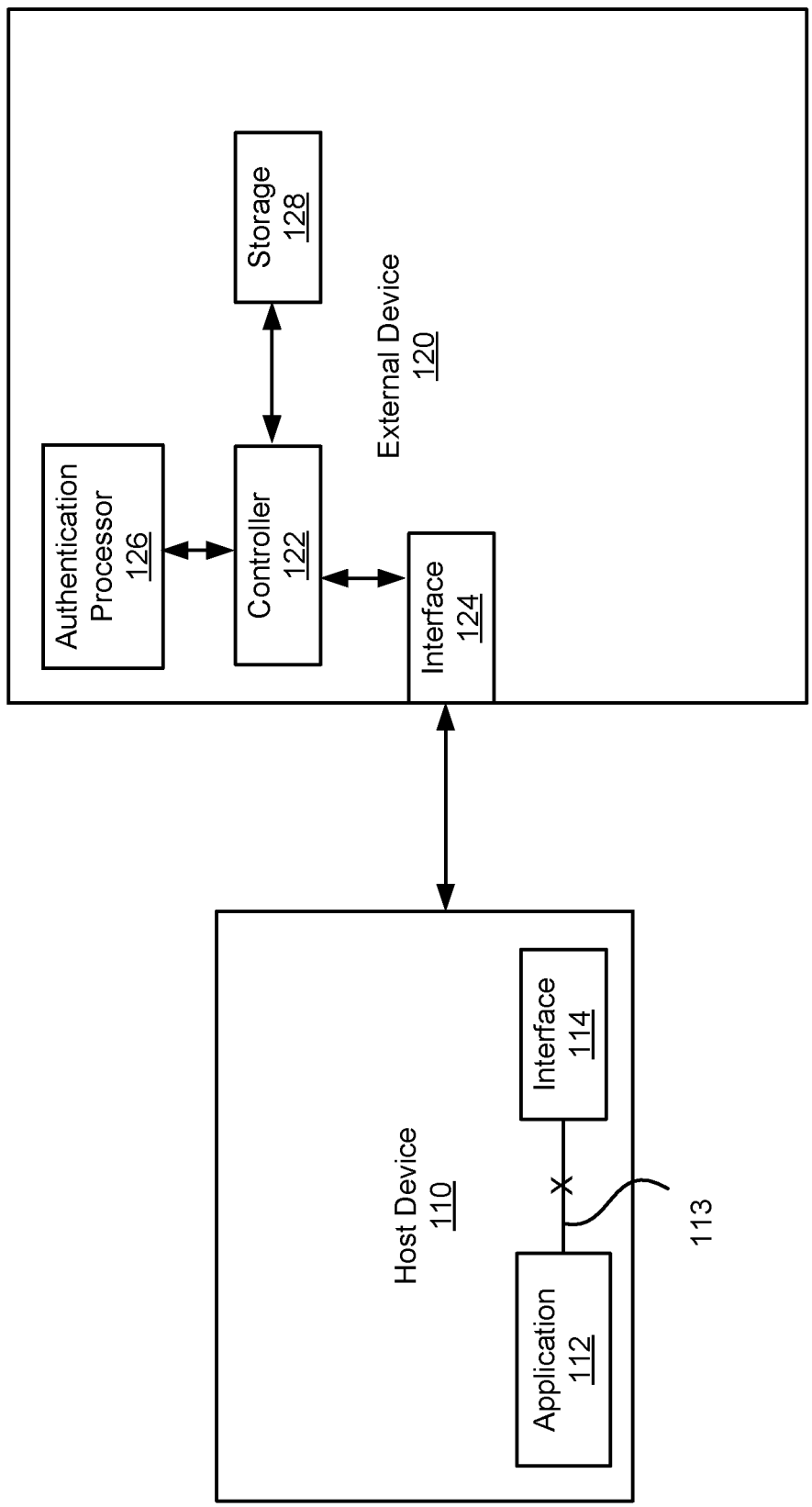
FIG. 1A shows a system with an external device prior to being authenticated according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "rendering," "detecting," "exposing", "processing", "reading", "writing" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Host devices, such as iPhones®, iPads®, or Android based phones may have a limited capability. For example, the amount of processing power, the amount of storage, etc. may be a fixed amount and it may be cumbersome or impossible to upgrade the capability. Additionally, some devices, e.g., storage devices (hard disk drive, solid state drives, etc.), may have a device specific interface to communicate with the host device such as iPhones®, iPads®, etc. while the host device may require a different interface causing a mismatch between the two. Accordingly, a need has arisen to expand the capability of the host device, e.g., additional storage, while addressing different interface requirements between the host device and the external device, e.g., storage device. It is appreciated that while the embodiments are described with respect to expanding the storing capability of the host device, e.g., by adding an external hard drive, the embodiments are not limited thereto. For example, processing power, graphical processing power, etc., of the host device may similarly be expanded using similar embodiments. As such, the embodiments describing the expansion of storage capability of the host device are for illustrative purposes only and not intended to limit the scope of the embodiments.

In some embodiments the system may include a host device, e.g., an iOS® device, and an external device. The iOS® device may store an application thereon. The external device may be a hard drive, for example. The external device may include an authentication processor, a microcontroller, and a storage component. The authentication processor may be configured to transmit authenticating data associated with the external device responsive to a request from the iOS® device. The microcontroller may be coupled to the authenticating processor. The microcontroller may be configured to receive the authenticating data from the authenticating processor. The microcontroller may be further configured to transmit the authenticating data to the iOS® device for authentication. The microcontroller is further configured to expose configuration interface and communication interface to the iOS® device after the external device is successfully authenticated by the iOS® device. Accordingly, the iOS® device may act as a master for the external device that acts as a slave. The external device is configured to process commands from the iOS® device. The storage unit may be coupled to the microcontroller and may be configured to receive or transmit payload data to the microcontroller. The microcontroller is further configured to communicate payload data with the application resident on the iOS® device according to the communication interface after the external device is authenticated by the iOS® device. The storage unit is further configured to communicate the payload data with the microcontroller via an interface other than the communication interface.

It is appreciated that the communication interface may include a block size and a block start point, a block start point and end point, a block start point and a block count, a block size and a block end point, etc. In some embodiments, the transmission of the authenticating data is through iAP-link protocol. In some embodiments, the communication interface is HTTP protocol and may include packet size, packet start point, packet end point, etc. The external device may include a connection such as USB type-B, USB type-C, USB 2, USB 3, etc., for facilitating communication between the microcontroller and the iOS® device that may include a connection such as a lightning connector. In some embodiments, an operating system driver of the external device may perform a handshake and communication with the application residing on the host device that uses a specialized interface such as External Accessory Interface, e.g., block size and a block start point, a block start point and end point, a block start point and a block count, a block size and a block end point, etc.

Referring now to FIG. 1A, a system with an external device prior to being authenticated according to one aspect of the present embodiments is shown. The system includes a host device 110, e.g., a mobile phone, a smart phone, a tablet, a drone, a laptop, etc., and an external device 120. The host device may be an iOS® device, e.g., Apple iPhone®, iPad®, etc., in some embodiments. The external device 120 may be a device that expands capability of the host device 110. For example, the external device 120 may be a hard drive, a solid state drive, a graphics pipeline unit, etc. For illustrative purposes, the embodiments are described with respect to a hard drive but it is appreciated that the embodiments are not limited thereto and should not be construed as limiting the scope of the embodiments.

In some embodiments, the host device 110 provides a specific mechanism to expose an input/output (I/O) stream over its interface connector, also known as External Accessory Interface. For example, a driver for the host device 110 may expose a configuration that has an authentication endpoint and a communication interface known as a native endpoint (in some embodiments an External Accessory Endpoint). In some embodiments, the host device 110 includes an application residing on the host device 110 and an interface 114. The interface 114 may be a connector, e.g., Lightning connector, a custom-built cable that wires the USB pads on the Lightning connector to a USB type-B interface of the external device 120, etc. In some embodiments, the interface 114 may be USB type-B, USB type-C, USB 2, USB 3, etc. The host device 110 may include other components that are not illustrated in order to avoid obscuring the embodiments.

The external device 120 may include an authentication processor 126, a controller 122, a storage component 128, and an interface 124. The controller 122 may be a microcontroller, processor, Field Programmable Gate Array (FPGA), Application Specific Integrated Circuit (ASIC), etc. It is appreciated that the storage component 128 may be a hard drive, a solid state drive, etc. In some embodiments the interface 124 may be a lightning connector, USB type-B, USB type-C, USB 2, USB 3, etc.

It is appreciated that in some embodiments the host device 110 disallows communication with the external device 120 unless the external device 120 is authenticated. As such, in some embodiments, the authentication processor 126 is configured to provide the authenticating data to the host device 110 when connected to the host device 110. For example, initially when the external device 120 is connected to the host device 110, the external device 120 receives a request from the host device 110 for the authenticating data. The authenticating data is provided by the authenticating processor 126 to the controller 122 and transmitted via the interface 124 to the host device 110. It is appreciated that in some embodiments the authentication communication is achieved using a linking protocol, e.g., iAPlink. For example, the interface 124 may provide a serial character interface to establish communication between the host device 110 and the external device 120. The authenticating data may include handshaking data. It is appreciated that until the external device 120 is authenticated by the host device 110, the communication interface line 113 for the application 112 is not enabled, therefore preventing the application 112 from communicating with external device 120 via its interface 114. In other words, the communication interface line 113 is disabled until the external device 120 becomes authenticated. It is appreciated that the authenticating processor and communication interface of the external device 120 may be implemented as a driver, e.g., the authentication daemon, and the application command interface, etc.

It is appreciated that in some embodiments, the external device 120 may also provide configuration interface data to the host device 110. For example, the configuration interface data may include a USB protocol, data transport, configuration parameters, etc. In other words, the external device 120 communicates the type of interface connector that the external device 120 is using to the host device 110. It is further appreciated that in some embodiments, the external device 120 may also provide the communication interface to the host device 110. The communication interface may for example be associated with the size of the storage, a block size and a block start point, a block start point and end point, a block start point and a block count, a block size and a block end point, etc.

Figure 1B:
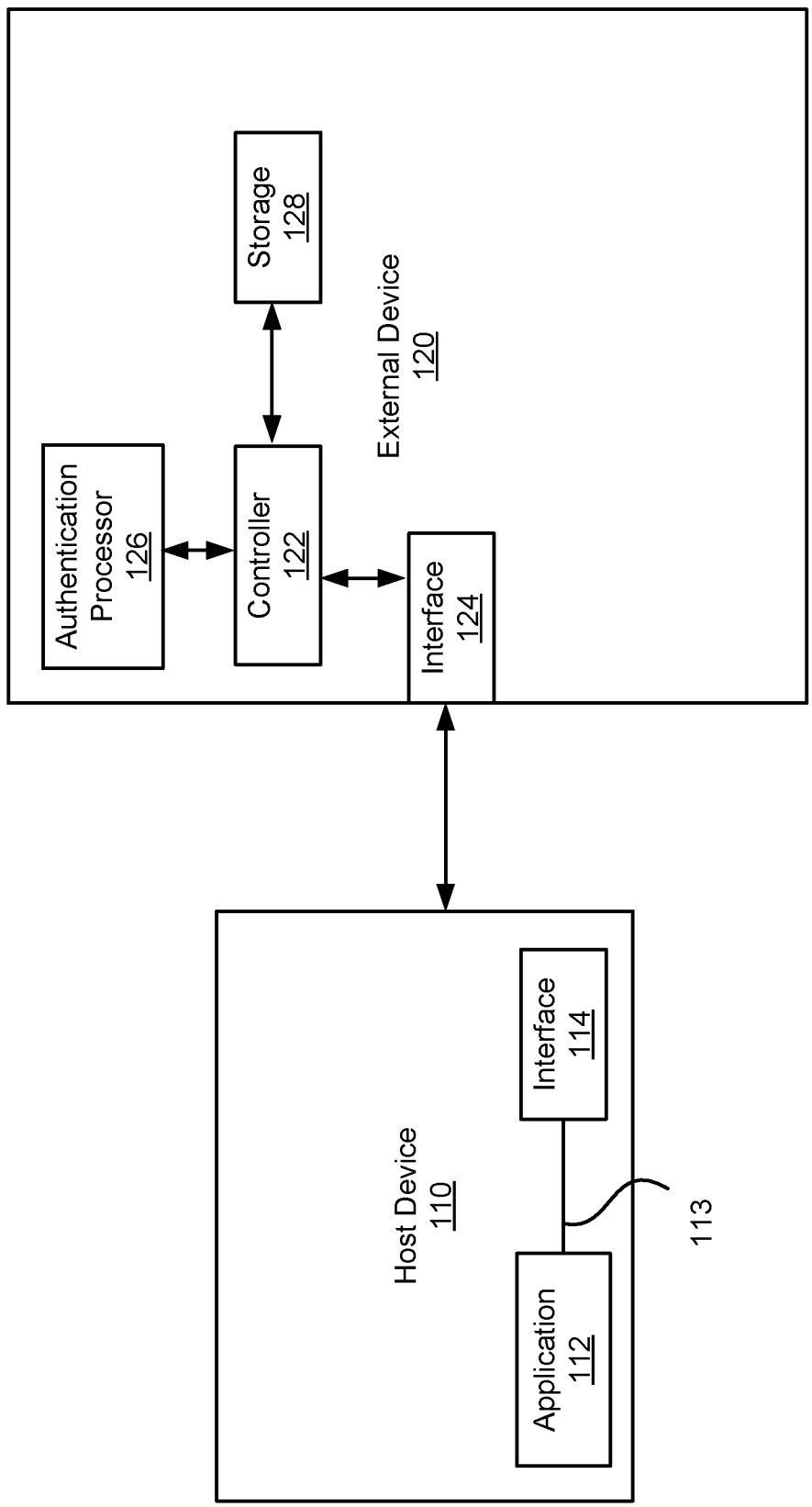
FIG. 1B shows a system with an external device after being authenticated according to one aspect of the present embodiments.

Referring now to FIG. 1B, a system with an external device after being authenticated according to one aspect of the present embodiments is shown. Once the host device 110 authenticates the external device 120, it activates the data link and the communication interface line 113 of the application 112, thereby enabling communication between the host device 110 and the external device 120 via their respective interfaces 114 and 124. Once the communication interface line 113 is activated, the application 112 may use the I/O stream to provide a series of commands to the external device 120. For example, the application 112 may provide commands related to reading and writing data into the external device 120. The commands may be related to data storage and it may include the size of the storage, a block size and a block start point, a block start point and end point, a block start point and a block count, a block size and a block end point, etc. In other words, the external device 120 becomes the slave and the host device 110 becomes the master. As such, the host device 110 provides commands and/or payload data to the external device 120 and the external device 120 processes the commands and/or payload data and responds to the host device 110.

It is no longer necessary for the host device 110 to have any knowledge regarding the specific interface protocol of the external device 120 or to communicate according to the specific interface protocol of the external device 120. Communication in a non-specific interface protocol, e.g., block level, to the external device 120 is possible because the application 112 takes control of the communication once the host device 110 has successfully authenticated the external device 120. The application 112 communicates in an interface protocol fashion that is different from the specific interface protocol of the external device 120 because the controller 122 of the external device 120 translates the received commands, payloads, etc., to the specific interface protocol of the external device 120. For example, the application 112 through its activated communication interface line 113 may communicate commands and/or payload data such as the size of the storage, a block size and a block start point, a block start point and end point, a block start point and a block count, a block size and a block end point, etc., via the host device 110 interface 114 to the external device 120 interface 124. The interface 124 receives the commands, payloads, etc., and transmits the data and/or commands to the controller 122 for processing. In some embodiments, the controller 122 may strip off the configuration protocol data, e.g., USB type-B, USB type-C, USB 2, USB 3, etc., when communicating data/commands from the host device 110 to the storage 128 component. The controller 122 may then translate the received data and/or commands to a format used by the storage 128 component, e.g., a hard drive, solid state drive, etc., of the external device 120. For example, commands and/or payloads in size of the storage, a block size and a block start point, a block start point and end point, a block start point and a block count, a block size and a block end point, etc., may be translated to a format used to read/write by a hard drive, solid state drive, etc., such as Serial ATA (SATA), SCSI, Serial Attached SCSI, etc.

Similarly, the external device 120 may communicate in a non-specific interface protocol fashion with the host device 110. For example, the storage 128, e.g., a hard drive, a solid state drive, etc., may transmit payload data or processed data to the controller 122 according to its specific interface protocol, e.g., SATA, SCSI, Serial Attached SCSI, etc. The received information by the controller 122 may then be translated into another protocol format. For example, the received information may be translated to size of the storage, a block size and a block start point, a block start point and end point, a block start point and a block count, a block size and a block end point, etc. Once translated, the controller 122 transmits the translated data to the interface 124 for transmission to the host device 110. The interface 114 of the host device 110 receives the transmitted data and sends the data to the application 112. The application 112 in some embodiments may perform additional processing, translation, etc., before exposing the received data to other components of the host device 110.

It is appreciated that the external device 120 may include pool buffers in order to read and write to the storage 128 component. It is further appreciated that the external device 120 may also include pool of buffers to read and write the responses to the host device 110. In some embodiments, the pool of buffers to read and write to/from the storage component 128 is different from the pool of buffers to read and write the responses to the host device 110.

Figure 2:
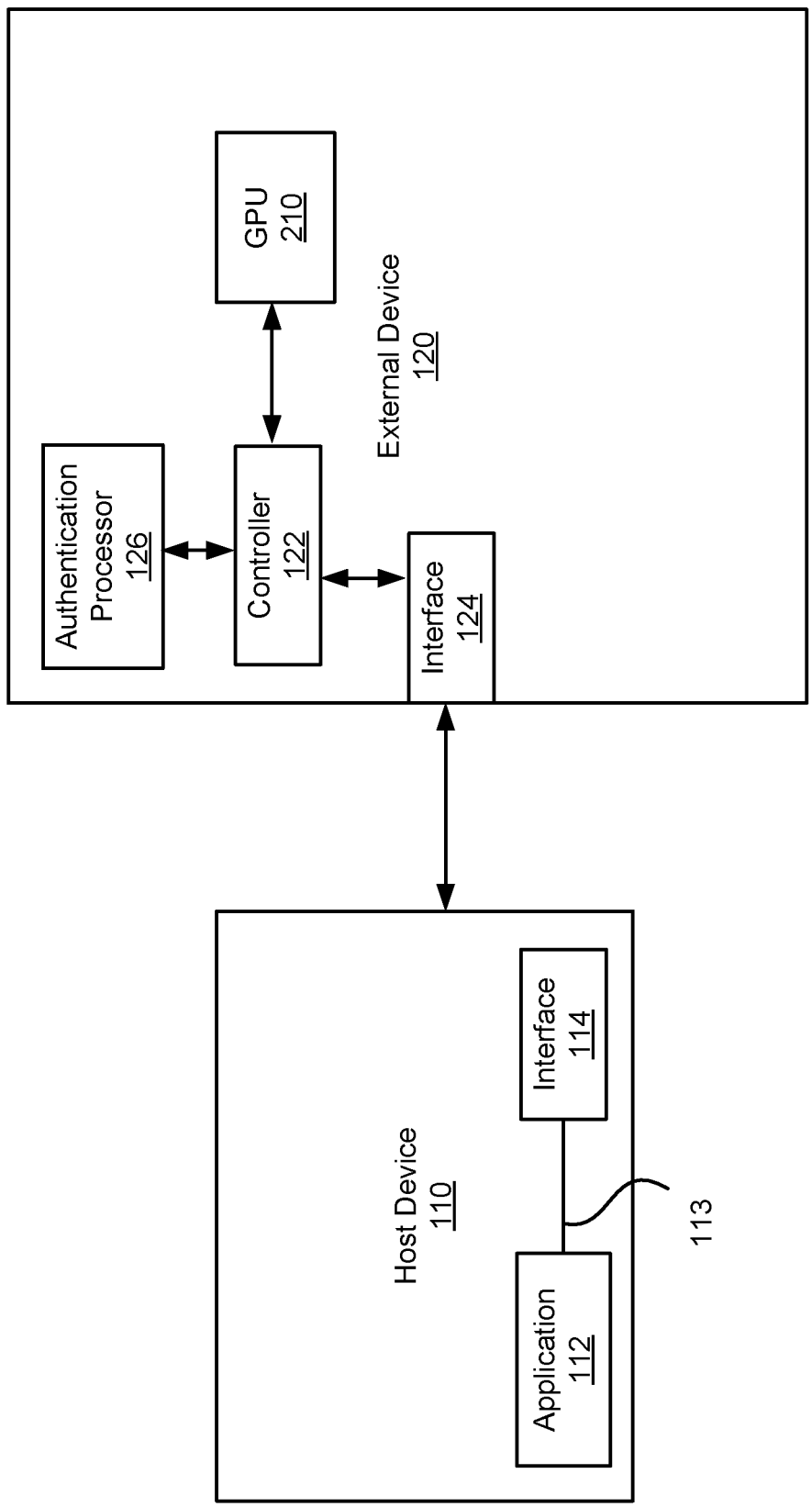
FIG. 2 shows another system expanding iOS® device capability according to one aspect of the present embodiments.

Referring now to FIG. 2, another system expanding iOS® device capability according to one aspect of the present embodiments is shown. FIG. 2 is substantially similar to that of FIGS. 1A and 1B and operates in substantially a similar manner. In FIG. 2, however, the external device 120 includes a graphics pipeline unit 210 to expand the processing power of the host device 110 and further to expand processing of network level commands. It is appreciated that payload data and/or commands may be communicated between the host device 110 and the external device 120 according to network level formats, e.g., packet size, packet starting point, packet ending point, etc. As such, use of the block level commands, as described in FIGS. 1A-1B, is exemplary and not intended to limit the scope of the embodiments.

Figure 3:
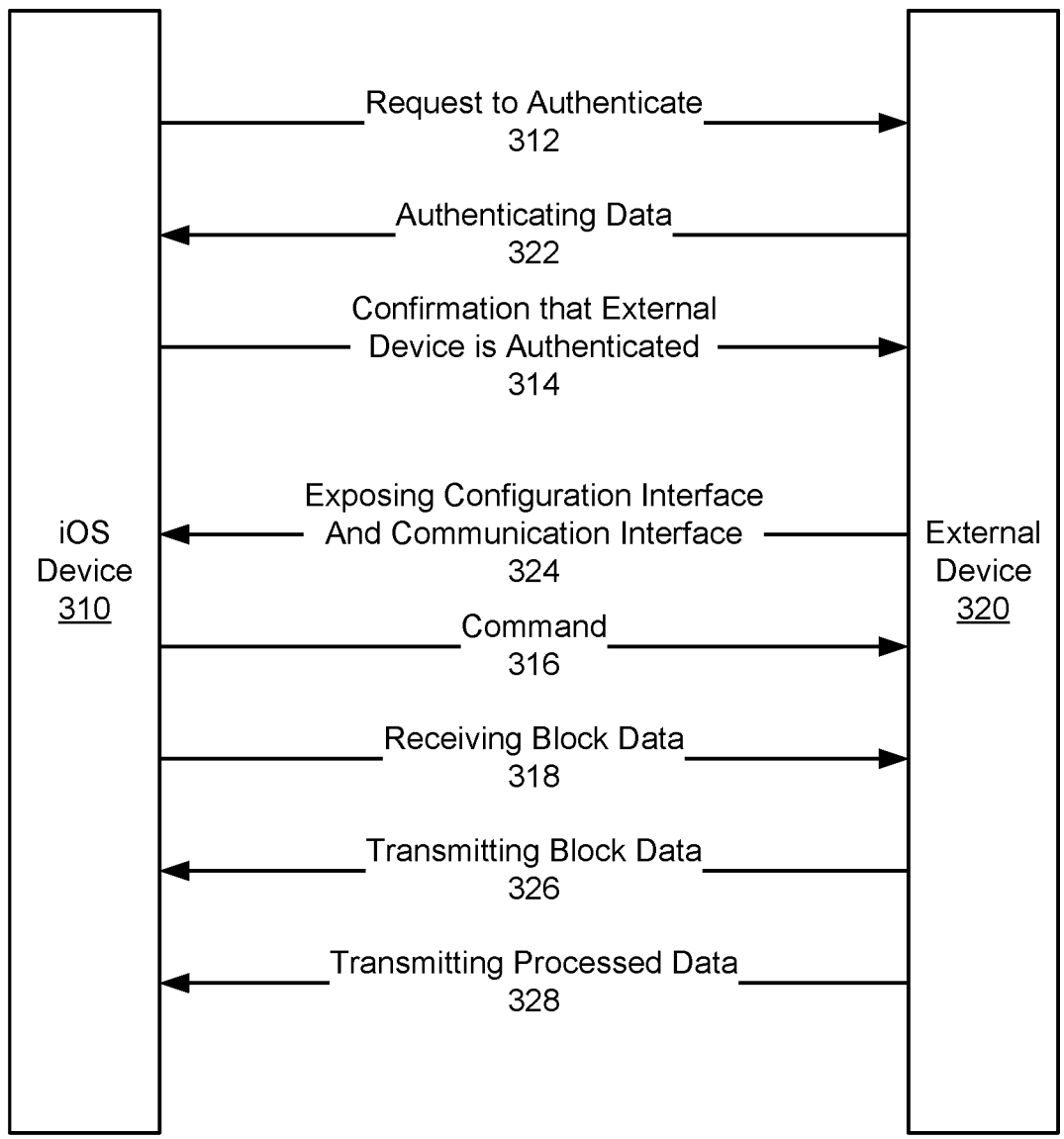
FIG. 3 shows communication between an iOS® device and an external device according to one aspect of the present embodiments.

Referring now to FIG. 3, communication between an iOS® device 310 and an external device 320 according to one aspect of the present embodiments is shown. It is appreciated that the iOS® device 310 is substantially similar to that in FIGS. 1A-1B and 2 and operates in substantially a similar manner. Moreover, it is appreciated that the external device 320 is substantially similar to that in FIGS. 1A-1B and 2 and operates in a substantially similar manner. Once the external device 320 is connected to the iOS® device 310, the iOS® device 310 may request 312 authenticating data. It is appreciated that the iOS® device 310 may have a connector, e.g., USB type-B, USB type-C, USB 2, USB 3, etc., that is connected to a connector, e.g., lightning connector, of the iOS® device 310. It is appreciated that there may be a mismatch between the type of connectors for the iOS® device 310 and the external device 320.

In response to receiving the request, the external device 320 transmits the authenticating data 322 to the iOS® device 310. It is appreciated that the external device 320 may receive the request and access its authenticating processor, as described in FIGS. 1A-1B and 2 in order to fetch and transmit the authenticating data to the iOS® device 310. The iOS® device 310 receives the authenticating data and authenticates the external device 320. Once the external device 320 is successfully authenticated, a confirmation message 314 may be transmitted from the iOS® device 310 to the external device 320.

According to some embodiments, once the external device 320 is authenticated, the external device 320 exposes its configuration interface and communication interface 324 to the iOS® device 310. It is appreciated that in some embodiments the communication interface may be a block command format, e.g., a block size and a block start point, a block start point and end point, a block start point and a block count, and a block size and a block end point, etc. In some embodiments, the communication interface may be a network level command, e.g., packet size, packet starting point, packet ending point, etc. It is further appreciated that in some embodiments the configuration interface may be related to the type of connector that the external device 320 uses. For example, the configuration interface may be a USB type-B, USB type-C, USB 2, and USB 3.

The iOS® device 310 may act as the master for the external device 320 that acts as a slave. Thus, the iOS® device 310 may transmit commands 316 according to the communication interface and further based on the configuration interface via its application to the external device 310. The external device 320 may process the received information. For example, the controller 122 may strip off the configuration protocol data, e.g., USB type-B, USB type-C, USB 2, USB 3, etc., in order to expose the command. The external device 320 may process the received command 316, e.g., read, write, packet processing, etc. The controller 122 may translate the received command, e.g., block level command, to a specific interface protocol format for the storage 128 component. In other embodiments, the controller 122 may translate the received command, e.g., network level command, to a specific interface protocol format for the GPU 210. It is appreciated that the iOS® device 310 may similarly transmit block data 318, e.g., data payload for writing to the storage 128 component, for example. In some embodiments, the external device 320 may transmit the processed data 326, e.g., block data 326, to the iOS® device 310. The processed data 326 for example may be a result of the read command from the iOS® device 310 to read a particular data from the storage 128 that is communicated as block data 326 to the iOS® device 310. In some embodiments, the external device 320 may transmit the processed data 328, e.g., network level data 328, to the iOS® device 310. The processed data 328 for example may be a result of a network level command to be processed by the GPU 210.

Figure 4A:
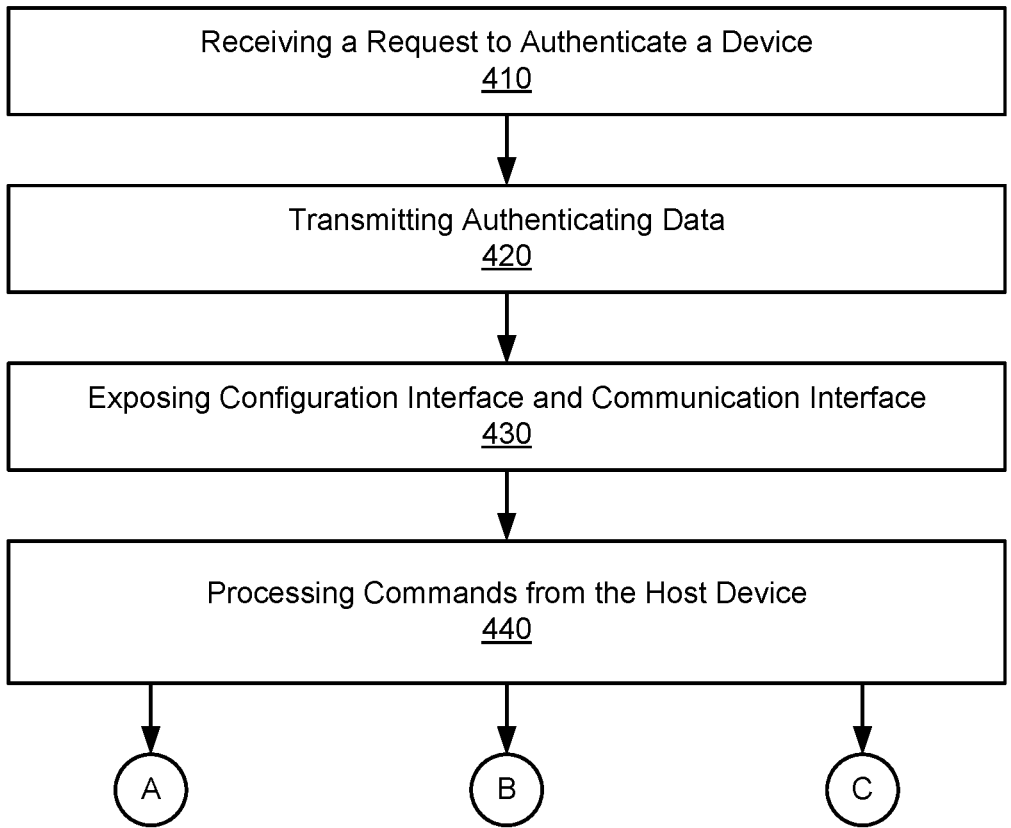
FIGS. 4A and 4B together show a flow diagram according to one aspect of the present embodiments.
Figure 4B:
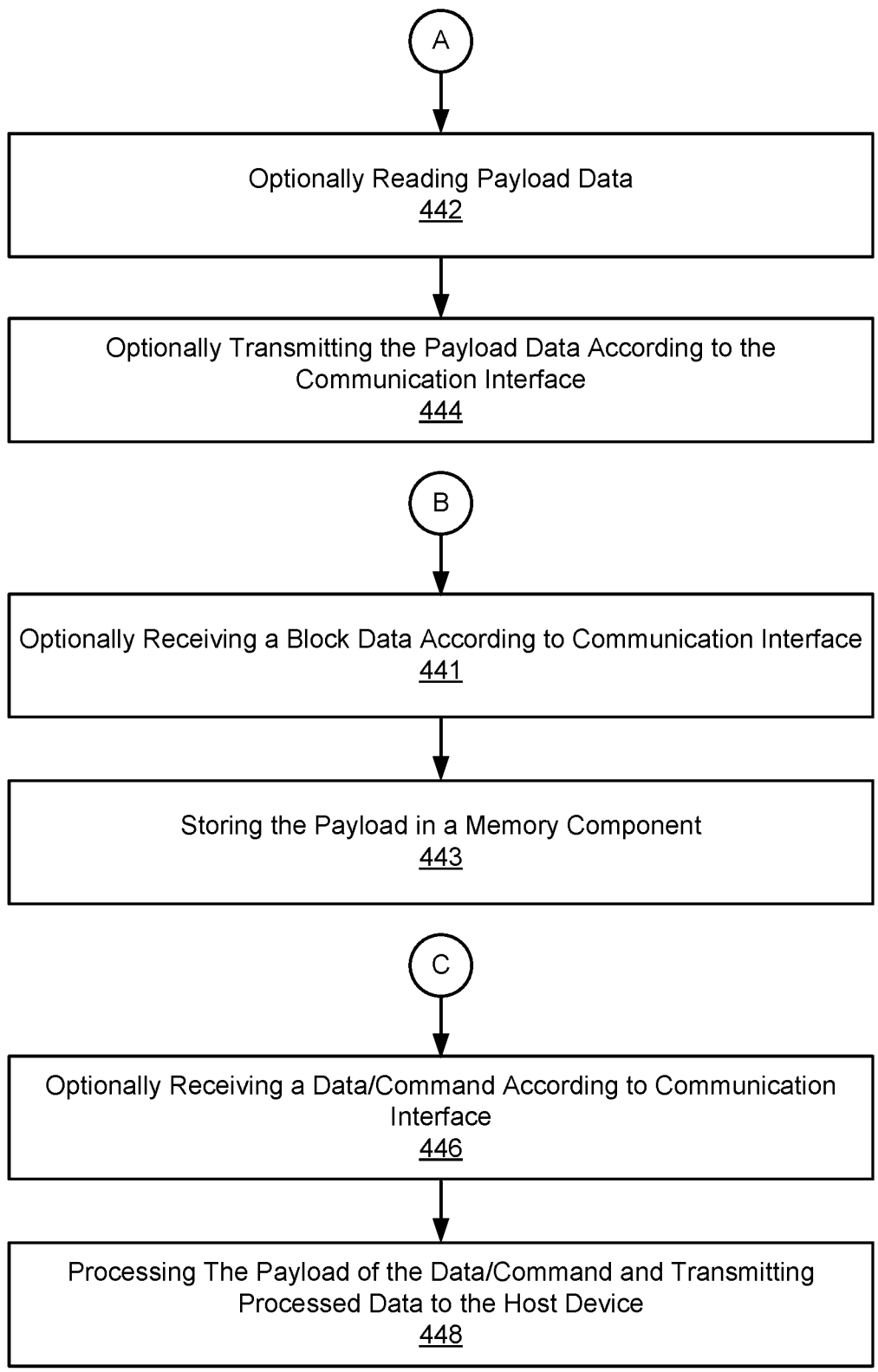

Referring now to FIGS. 4A and 4B, a flow diagram according to one aspect of the present embodiments is shown. At step 410, an external device may receive a request to be authenticated, as described in FIGS. 1A-3. The external device may subsequently transmit the authenticating data to the host device, at step 420, as described in FIGS. 1A-3. At step 430, the external device exposes its configuration interface as well as its communication interface to the host device, after it is successfully authenticated, as described in FIGS. 1A-3. At step 440, the external device processes commands from the host device, e.g., read command, write command, packet processing command, rendering command, etc. It is appreciated that the configuration interface information such as USB 2.0 protocol, etc., may be stripped off in order to access the command according to the communication interface. The controller 122 may then translate the received command that is according to the communication interface to the required format. For example, the block level commands may be translated to a SATA, SCSI, Serial Attached SCSI, etc., in order to be able to communicate with the storage component 128.

Optionally at step 442, if the received command is a read command, the data payload is read from the storage component 128. The read payload data may then be translated based on the communication interface, e.g., block level, and further be conformed based on the configuration data, e.g., USB 2, etc., before being transmitted to the host device at step 444.

Optionally at step 441, if the received command is a write a command, the data payload is received from the host device based on the communication interface and the configuration interface. The configuration interface may be stripped off by the controller 122 to expose the payload according to the communication interface. The payload according to the communication interface may then be translated to a format required by the storage component 128. Once translated to the proper format, the payload data may be transmitted for storage, at step 443.

Optionally at step 446, the external device may receive data/command according to communication interface, e.g., network level, packet processing, etc., from the host device. The configuration interface may be stripped off by the controller 122 to expose the payload according to the communication interface. The payload according to the communication interface, e.g., network level, may then be translated to a format required by the GPU 210. Once translated to the proper format, the data may be processed and translated based on the communication interface. The processed data that is translated according to the communication interface may then conform to the configuration interface prior to transmission to the host device, at step 448.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A device comprising:
an authentication processor configured to transmit authenticating data associated with the device responsive to a request from a host device;
a microcontroller coupled to the authenticating processor, the microcontroller configured to:
receive the authenticating data from the authenticating processor,
transmit the authenticating data to the host device for authentication,
expose configuration interface and communication interface to the host device after the device is successfully authenticated by the host device, and
process commands from the host device; and
a storage unit coupled to the microcontroller, the storage unit is configured to receive or transmit payload data to the microcontroller, the microcontroller is further configured to communicate payload data with an application residing on the host device according to the communication interface after the device is authenticated by the host device, the storage unit is further configured to communicate the payload data with the microcontroller via an interface other than the communication interface,
the communication interface employing an interface protocol that is different from a communication protocol of the host device, and components of the host device other than the application residing on the host device lacking any knowledge of the interface protocol, the interface protocol comprising:
a block size and a block start point;
a block start point and end point;
a block start point and a block count; or
a block size and a block end point, and
the interface protocol enabling communication of data from the storage unit to the host device in a manner that prevents exposure of the data to components of the host device until the data is translated by the application residing on the host device.

2. The device of claim 1, wherein the storage unit is a hard disk drive.

3. The device of claim 1, wherein the storage unit is a solid state memory.

4. The device of claim 1, wherein the configuration interface comprises USB protocol.

5. The device of claim 1, wherein the transmission of the authenticating data is through iAPlink protocol.

6. The device of claim 1 further comprising a connection for facilitating communication between the microcontroller and the host device, the connection is selected from a group consisting of a USB type-B, USB type-C, USB 2, and USB 3.

7. The device of claim 1, wherein the microcontroller is configured to communicate with a lightning connector of the host device.

8. A method comprising:
receiving a request from a host device to authenticate a device;
transmitting authenticating data to the host device;
responsive to successful authentication of the device, exposing configuration interface and communication interface of the device to the host device;
processing commands from the host device after the device is successfully authenticated; and
responsive to the processed commands, sending or receiving payload data to or from the host device according to the communication interface,
the communication interface employing an interface protocol that is different from a communication protocol of the host device, and components of the host device other than the application residing on the host device lacking any knowledge of the interface protocol, the interface protocol comprising:
a block size and a block start point; or
a block start point and end point; or
a block start point and a block count; or
a block size and a block end point, and
the interface protocol enabling communication of data from the storage unit to the host device in a manner that prevents exposure of the data to components of the host device until the data is translated by an application residing on the host device.

9. The method of claim 8, the processing commands comprising:
reading the payload data from a memory component on the device; and
transmitting the payload data as a block data to the host device according to the communication interface.

10. The method of claim 8, the processing commands comprising:
receiving a block data according to the communication interface, the block data comprising the payload data; and
storing the payload data in a memory component.

11. The method of claim 8, wherein the configuration interface comprises USB protocol.

12. The method of claim 8, wherein the transmitting authenticating data is through iAPlink protocol.

13. The method of claim 8, wherein a connection for facilitating communication between the device and the host device is selected from a group consisting of a USB type-B, USB type-C, USB 2, and USB 3.

14. A system comprising:
a host device comprising an application stored thereon; and
an external device comprising:
an authenticating processor configured to transmit authenticating data associated with the external device responsive to a request from the host device;
a microcontroller coupled to the authenticating processor, the microcontroller configured to:
receive the authenticating data from the authenticating processor,
transmit the authenticating data to the host device for authentication,
expose configuration interface and communication interface to the host device after the external device is successfully authenticated by the host device, and
process commands from the host device; and
a storage unit coupled to the microcontroller, the storage unit is configured to receive or transmit payload data to the microcontroller, the microcontroller is further configured to communicate payload data with the application resident on the host device according to the communication interface after the external device is authenticated by the host device, the storage unit is further configured to communicate the payload data with the microcontroller via an interface other than the communication interface, the communication interface employing an interface protocol that is different from a communication protocol of the host device, and components of the host device other than the application residing on the host device lacking any knowledge of the interface protocol, the interface protocol comprising:

a block size and a block start point; or a block start point and end point; or a block start point and a block count; or a block size and a block end point, and the interface protocol enabling communication of data from the storage unit to the host device in a manner that prevents exposure of the data to components of the host device until the data is translated by the application residing on the host device.

15. The system of claim 14, wherein the transmission of the authenticating data is through iAPlink protocol.

16. The system of claim 14, the external device further comprising a connection for facilitating communication between the microcontroller and the host device, the connection is selected from a group consisting of a USB type-B, USB type-C, USB 2, and USB 3, the host device comprising a lightning connector.

17. The system of claim 14, wherein the host device comprises an iOS® device.

\* \* \* \* \*